No. 633,672. Patented Sept. 26, 1899.
H. L. & F. X. WAGNER.
TYPE WRITING MACHINE.
(Application filed July 7, 1897.)

(No Model.) 8 Sheets—Sheet 1.

No. 633,672. Patented Sept. 26, 1899.
H. L. & F. X. WAGNER.
TYPE WRITING MACHINE.
(Application filed July 7, 1897.)
(No Model.) 8 Sheets—Sheet 3.

WITNESSES:
Gustave Dietrich
Charles P. Smith

INVENTORS
Herman L. Wagner
Franz X. Wagner
BY Briesen & Knauth
their ATTORNEYS

No. 633,672. Patented Sept. 26, 1899.
H. L. & F. X. WAGNER.
TYPE WRITING MACHINE.
(Application filed July 7, 1897.)
(No Model.) 8 Sheets—Sheet 6.

WITNESSES
INVENTORS
Herman L. Wagner
Franz X. Wagner,
BY
Briesen & Knauth
ATTORNEYS No. 633,672. Patented Sept. 26, 1899.
H. L. & F. X. WAGNER.
TYPE WRITING MACHINE.
(Application filed July 7, 1897.)
(No Model.) 8 Sheets—Sheet 7.

UNITED STATES PATENT OFFICE.

HERMAN L. WAGNER AND FRANZ X. WAGNER, OF NEW YORK, N. Y., ASSIGNORS, BY DIRECT AND MESNE ASSIGNMENTS, TO JOHN T. UNDERWOOD, OF SAME PLACE.

TYPE-WRITING MACHINE.

SPECIFICATION forming part of Letters Patent No. 633,672, dated September 26, 1899.

Application filed July 7, 1897. Serial No. 643,688. (No model.)

*To all whom it may concern:*

Be it known that we, HERMAN L. WAGNER, residing in New York, (Brooklyn,) Kings county, and FRANZ X. WAGNER, residing in the city and county of New York, State of New York, have invented certain new and useful Improvements in Type-Writing Machines, of which the following is a specification.

Our invention relates to various improvements in type-writers or type-writing machines, and said invention relates more particularly to a type-writing machine such as that illustrated in our Patent No. 559,345, dated April 28, 1896.

The object of our invention is to overcome the disadvantages heretofore found in type-writing machines and to produce an efficient type-writer which will be effective under all conditions.

The invention may briefly be said to comprise, first, improved means for shifting the platen to write upper or lower case characters in such a manner that the platen is held or locked against vibration in any position in which it rests; second, improved means for releasing the feed-rollers which coöperate with the platen to bring about the line-feed of the paper; third, an improved detachable envelop-guide, and, fourth, hand-operated means for releasing the type-bar lock after the same has been operated automatically to lock the type-bars against movement.

The invention consists in the novel arrangement and combination of parts and details hereinafter described and claimed.

In the accompanying drawings, wherein like characters represent corresponding parts in the various views, Fig. 4$^a$ is a fragmentary perspective view of the same. Fig. 4$^b$ is a fragmentary bottom view of the stop and its coöperating mechanism. Fig. 5 is a transverse sectional view of the entire machine on line 5 5 of Fig. 1 looking in the direction of the arrow $x$. Figs. 5$^a$ and 5$^b$ are a fragmental detail face view and end view, respectively, of parts to be hereinafter described. Fig. 5$^c$ is a view corresponding to Fig. 5$^a$, except that the parts are shown in different positions. Fig. 11$^a$ is a detail front view of a portion of the ribbon-spool-shifting mechanism.

In the accompanying drawings, 1 represents the framing of a type-writing machine in which the various working parts are mounted.

Figure 12:
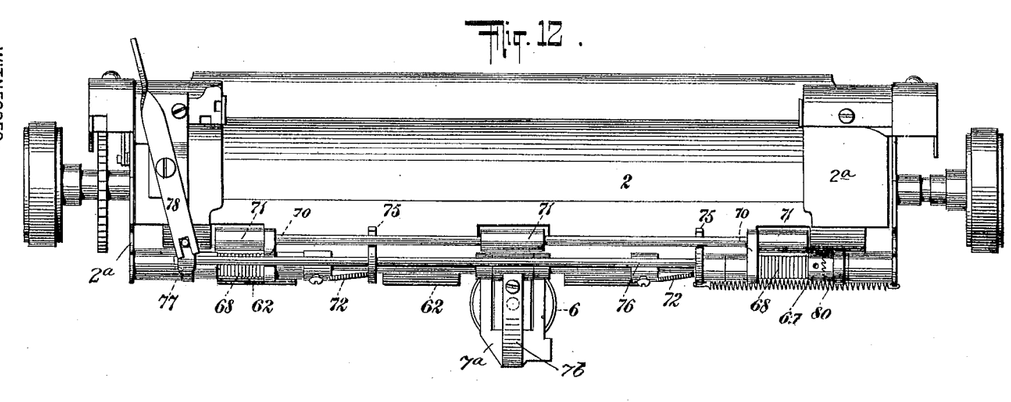
Fig. 12 is a detached front view of the platen-support, platen, and its coöperating feed-rollers.
Figure 13:
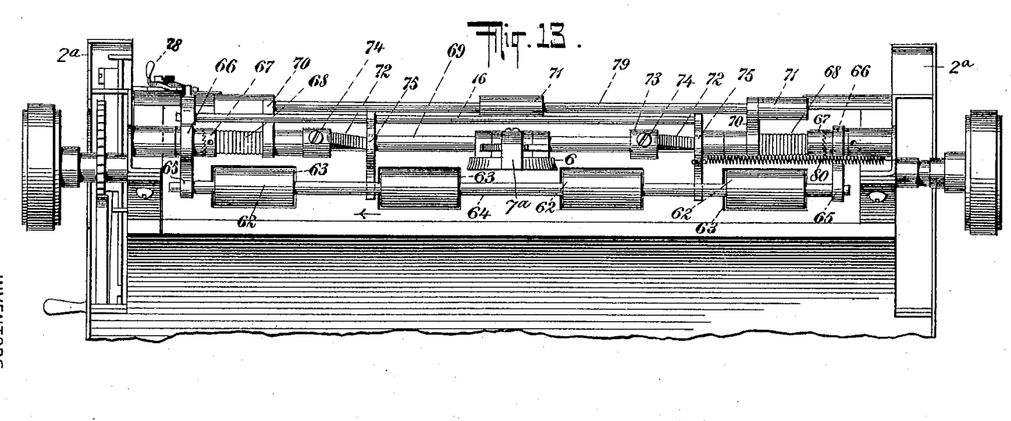
Fig. 13 is a bottom view of the same.

The machine is provided with a reciprocating carriage which has a vertically-shiftable platen 2, carried by an independent casing, and is supported, together with its casing, in bearings 3, carried by links 4, which are pivoted to a rod 5, one of said links being provided at each end of the machine. Coöperating with the platen 2 are various feed-rollers carried by a platen-casing, as is clearly illustrated in detail in Figs. 12 and 13 and which will be hereinafter more fully described. These parts are carried or supported upon a roller 6, which is carried by the platen-casing 2$^a$ and bears upon a rail 7, each end of which is connected with a bell-crank lever 8 8$^a$, which we term "platen-supporting" levers. In order to prevent the roller 6 and the parts supported thereby from moving away from the rail 7 when the parts are shifted vertically, we provide a pivoted arm 7$^a$, which is carried by the platen-casing 2$^a$ and takes under the rail, as clearly shown in Figs. 2 and 5, a spring 7$^b$ tending to normally maintain the parts in the position illustrated. The platen-supporting levers 8 and 8$^a$ are pivoted to the framing of the machine, as indicated at 9, and are themselves united by rock-shaft 10, so that motion transmitted to one of the levers will cause the one at the opposite end of the frame to receive a corresponding movement. It being remembered that the platen-frame, together with the platen carried thereby, which is illustrated in Figs. 12 and 13, is held in place upon the paper-carriage by the links 4, and by reason of the fact that the roller 6 bears upon the rail 7, it will be understood that a movement imparted to the bell-crank-levers 8 and 8$^a$ will cause the rail 7, together with the platen, to be either elevated or depressed to bring the platen to a position where it will receive the impact of either an upper or lower case character, as the case may be.

Figures 5, 5A, 5B:
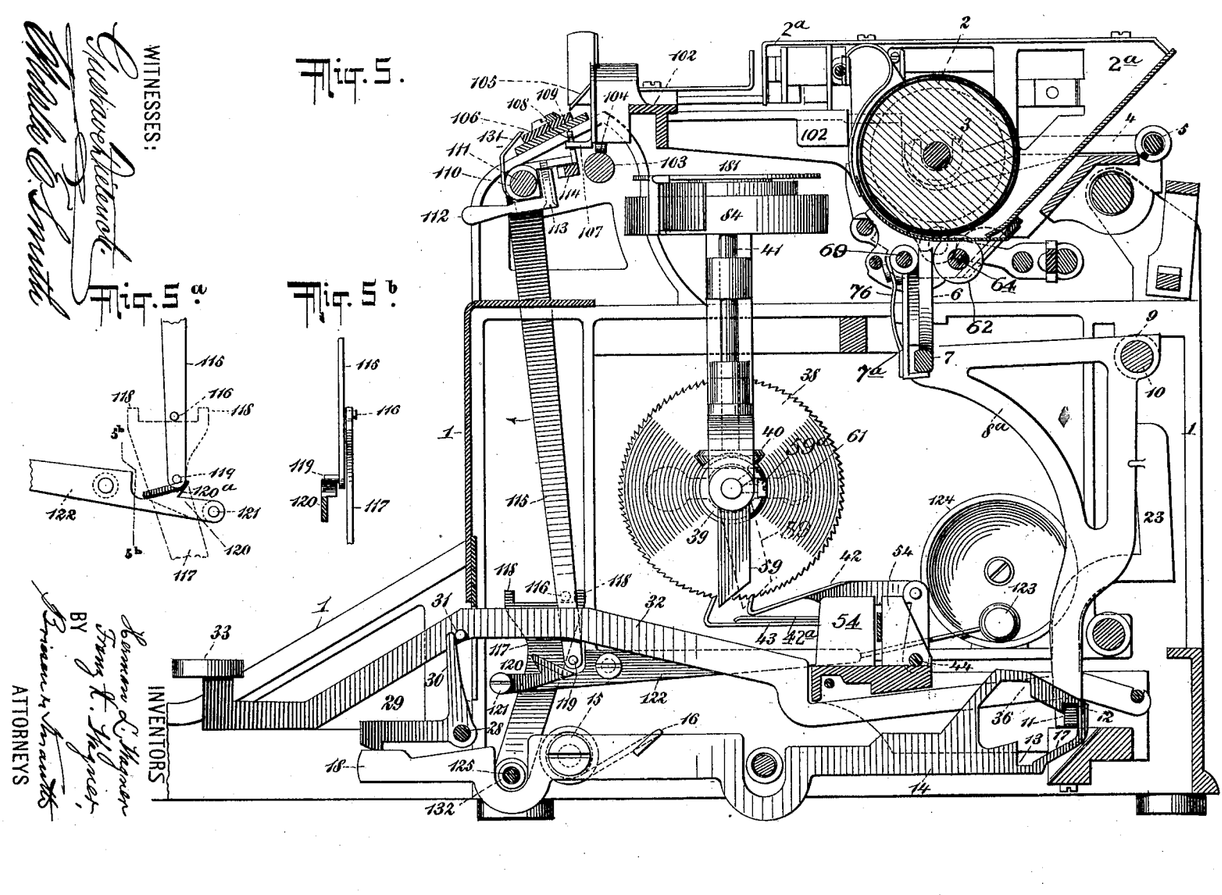
Figure 5C:
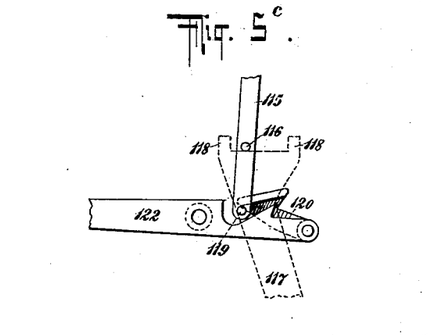
Figure 6:
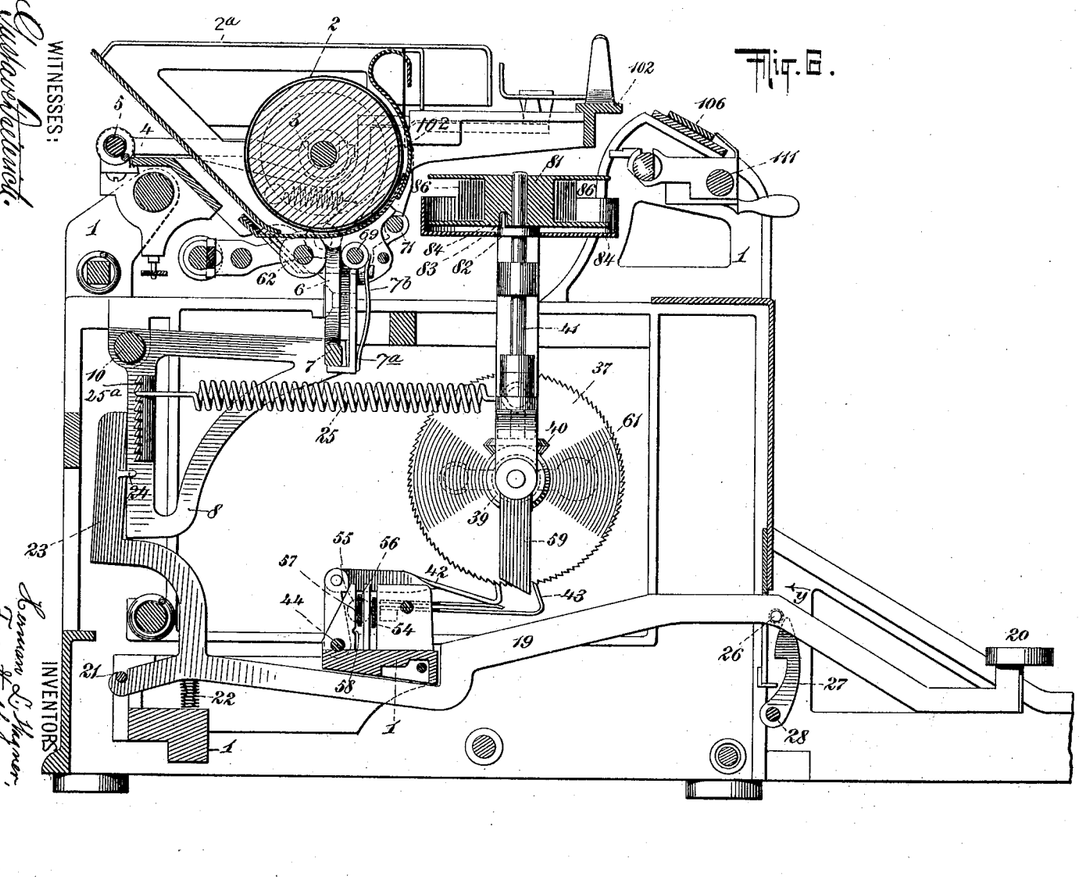
Fig. 6 is a transverse sectional view of the entire machine, taken on the line 6 6 of Fig. 1 and looking in the direction of the arrow $z$.
Figures 7, 8, 9:
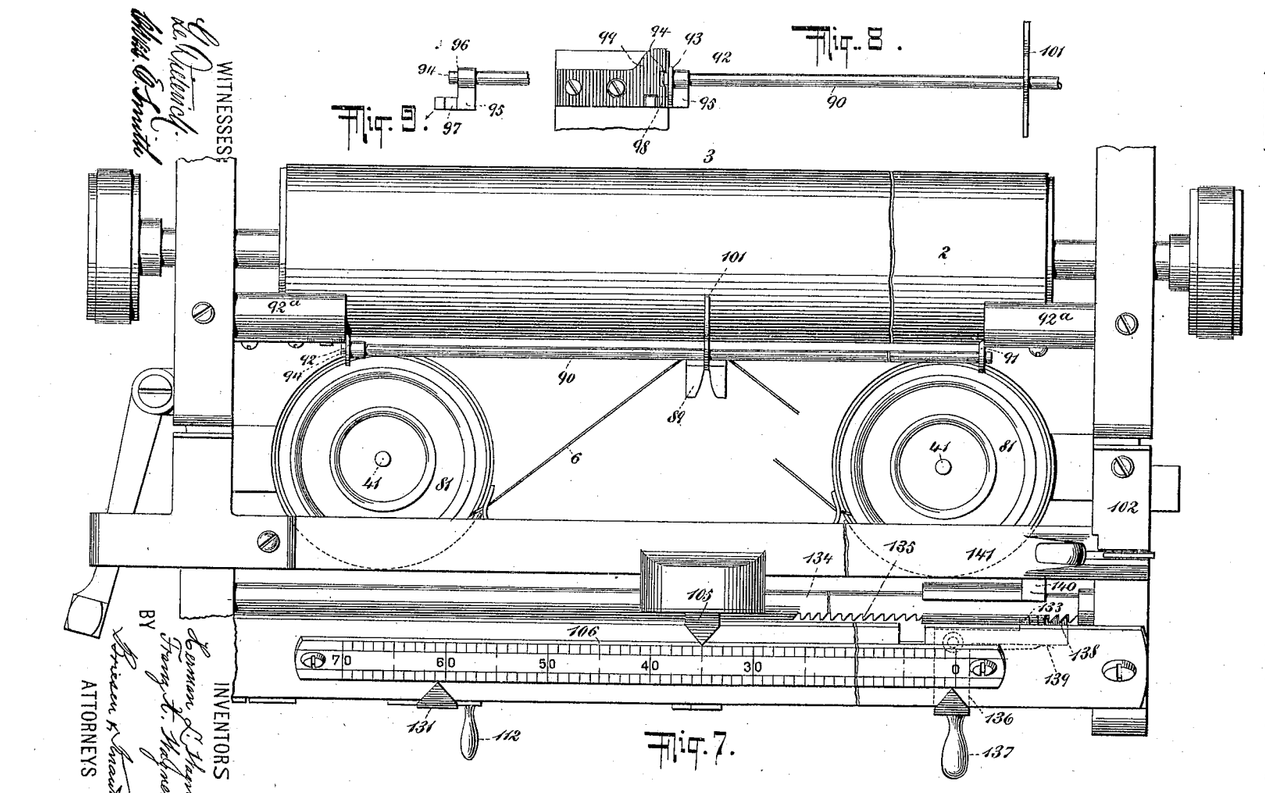
Fig. 7 is an enlarged detail top view, with parts broken away, of the platen carriage and frame and with parts removed for purpose of clearness.
Fig. 8 is a fragmental face view of the envelop-guide.
Fig. 9 is an enlarged detail of a portion of the same.

The free end of one of the bell-crank platen-supporting levers 8$^a$ is provided with an angular lug 11, projecting from the face thereof. This lug is of a size which corresponds with the openings 12 13 in an independent locking-lever 14, which is pivoted at 15 and normally maintained in the position represented in Fig. 5 by a spring 16. The openings 12 and 13 constitute portions of an internal recess or opening contained in the lever 14 and in which a stud or lug 11 is adapted to operate. The different portions of this opening in the lever 14 constitute guiding-surfaces and locking-faces, as will be fully explained. Thus, for instance, the inclined portion 17 constitutes a guiding-face against which the lug 11 is adapted to bear when the free end 18 of the locking-lever 14 is depressed. This locking-lever 14 is pivoted, preferably, at one end of the machine, and at the opposite end of the machine is a second shifting-lever 19, which is clearly illustrated in Fig. 6. This shifting-lever 19 is provided with a finger-key 20 and is pivoted to the framing of the machine, as indicated at 21, and normally maintained in the elevated position by a coiled spring 22. The arm 23 of this lever is adapted to bear against the face or edge of the platen-supporting lever 8 and is maintained in contact therewith by a lug 24 on each side thereof. This bell-crank lever 8 has connected therewith a coiled spring 25, which normally tends to maintain the platen 2, its casing, and the parts connected therewith in an elevated position, or, in other words, spring 25 operates as a counterbalance for the platen and the parts connected therewith, it being understood that the tension of this spring is not sufficiently strong to overcome the weight of the platen and its connections, but facilitates the movement of these parts. In the present instance the spring 25 is shown to engage serrations or teeth 25$^a$, Fig. 6, carried by the bell-crank lever 8, so that the spring may be connected to the lever 8 at different points to increase or decrease the effect thereof. The forward end of the shifting-lever 19 is provided with a pin 26, which is adapted to bear against the face of a pawl 27, which is connected with a rock-shaft 28, to the opposite end of which rock-shaft is secured a bell-crank lever 29, (see Fig. 5,) one arm 30 of which normally projects into the path of a pin 31 on the lever 32, which corresponds to the shifting-lever 19 and is provided with a finger-key 33. The free end 18 of the spring-pressed locking-lever 14 normally maintains the bell-crank 29 and the pawl 27 in the position illustrated in Figs. 5 and 6, so that when the key 20, Fig. 6, is depressed the pin 26 on the lever 19 will be engaged by the hook in the pawl 27 and prevent the upward return of the lever, and the bell-crank lever 29 will at the same time cause the free end 18 of the locking-lever 14 to be depressed to effect a locking of the platen against vibration. The operation of this portion of our device is as follows: Should the operator desire to shift the platen to cause upper-case characters 34 on a type-bar 35 to contact therewith, it is merely necessary to depress the key 20, when the arm 23 on the lever 19 will shift the bell-crank platen-supporting lever 8 around its pivot and cause the track 7, together with the platen and parts supported thereby, to be moved around the pivot 5 of the link 4. The movement of this bell-crank lever 8 produces a corresponding movement of the bell-crank lever 8$^a$ at the opposite end of the machine through the intermediate rock-shaft 10, which unites the two, so that both ends of the rail 7 will be elevated simultaneously. The depression of the key 20 likewise causes the pawl 27 to engage the pin 26 on the lever 19 and to maintain the platen in the elevated position. The forcing of the pawl 27 to one side likewise causes the rock-shaft 28 to be turned, thereby operating the bell-crank lever 29 to effect a movement of the locking-lever 14 around its pivot. This movement of the lever 14 causes the guide-face 17 to contact with the lug 11 on the bell-crank lever 8$^a$, and said lug rides along the guiding-face until it reaches the locking-recess 13, in which it is adapted to fit. By the time this movement is accomplished the hook in the pawl 27 is reached, and a movement of the pawl 27 in the direction of the arrow $y$, Fig. 6, is allowed, which movement allows of the return of the bell-crank 29 to its normal position, (shown in Fig. 5,) and the spring 16 causes the recessed end of the lever 14 to be depressed, thereby bringing a locking-recess 36 into engagement with the lug 11 on the bell-crank lever 8. Thus it will be seen that not only in the positions of rest, but in the various movements of the shift, the free end of the bell-crank lever 8$^a$, which carries the stud 11, is held against vibration, so that perfect alinement of the type impinging against the platen can be provided. It is obvious that if the least vibration was had during the impinging of the type perfect alinement could not be obtained. In the first instance the free end of the bell-crank lever 8$^a$, which carries the stud 11, is locked in the recess 12. It is next forced and held by positive pressure in the recess 13, and finally is engaged in the recess 36, so that movement of the bell-crank and the parts controlled thereby cannot be had.

In order to release the platen from the elevated position to which it has been shifted by the key 20, it is merely necessary to depress the key 33, when the pin 31 thereon will contact with the arm 30 of the bell-crank lever 29 and through its rock-shaft 28 cause the pawl 27 to be thrown out of engagement with the pin 26 on the shifting-lever 19 and allow the parts to resume their normal position.

We have described the means for shifting the platen to continually write upper-case characters. When it is decided to merely write, say, one upper-case character and allow the platen to at once resume its normal position, the key 33 is depressed, when the arm 23 thereon effects a movement of the bell-crank lever 8ª and the parts supported thereon, as when the bell-crank lever 8 is moved. At the same time the pin 31 on the lever 32 contacts with the arm 30 of the bell-crank lever 29 and by this means transmits motion to the locking-lever 14, causing it to move around its pivot 15. This movement of the lever 14 around its pivot causes the locking-recesses therein to be brought into engagement with the lug 11 on the free end of the bell-crank lever 8ª. At the same time said bell-crank lever is moved around its pivot to raise the platen, the final movement of the parts leaving the lug 11 in the recess 13 of the locking-lever 14 to lock the parts against movement in the position to which they are shifted, and when the finger releases the key 33 the parts will resume the normal position illustrated in Fig. 5.

The means for controlling the extent to which the ribbon is fed from one spool to another at each operation of a type-key or space-key, which is hereinafter shown, will be described, though such means do not form part of the present invention, but are included in a divisional application, filed on the 13th day of March, 1899, Serial No. 708,952. In the present instance we have shown the means for moving the spools to comprise two ratchet-wheels 37 38, each of which is connected by bevel-gear 39 40 with a spindle 41, which rotates a spool. Each of these ratchet-wheels is operated by a reciprocating pawl 42, a non-reciprocating spring-pressed pawl 43 being provided for each of the ratchet-wheels and one of which is in constant engagement with a ratchet-wheel to prevent a backward movement thereof. The reciprocating pawls 42 are carried upon a rock-shaft 44, which is also provided with a link 45, (see Fig. 2,) and the free end of each of the pawls 42 is supported upon a spring 42ª, which is carried by the support of the pawls 43, while the link 45 is operated from a rocking projection 46, connected with the spacing mechanism. This rocking projection 46 may likewise be operated by the spacing-lever 47, which is provided with a spacing-bar 48, extending across the front of the machine. The projection 46 on the spacing mechanism is operated at each operation of a type-bar 35 by a shoulder 49 thereon contacting with a universal bar 50 just before the type on the type-bar has contacted with the platen. The universal bar 50 is connected with arms 51 by means of links 52. The arms 51 are rigidly connected with a rock-shaft 53, to which is likewise rigidly connected the projecting arm 46. Thus it will be seen that a type-bar will contact with the universal bar 50 at each operation of the type-bar and move the arm 51 through the connection 52 and will shift the rock-shaft 44 through the connection 46, carried upon the rock-shaft 53, to produce a movement of the pawls 42 at each operation of a type-bar. Each of what we have termed the "non-reciprocating" pawls 43 is carried by a bar 54, which extends the length of the machine and is pivoted centrally therein, as indicated at 54ª. This bar 54 is provided at one end, where it projects beyond the machine, with a handle 55. The bar 54 carries a spring 56, provided with a stud 57, which is adapted to engage in the recesses 58 to maintain either end of the bar 54 either in the elevated position illustrated in Fig. 6, wherein the pawls are adapted to engage the ratchet-wheels, or to maintain the pawls out of engagement with a ratchet-wheel when one end of the bar is lowered and the stud 57 engages the lowermost recess 58 in a part of the framing 1. It being understood that the bar 54 is pivoted centrally, it will be obvious that to lower one end of the bar will raise the other, so that as the pawls at one end of the machine are raised into engagement with the ratchet-wheel the pawls at the opposite end will be disengaged or lowered. By this means the device may be set to automatically feed from one spool to the other in either direction.

It is desirable in type-writer machines to provide means for varying the extent of speed of the feed of the ribbon. In order to accomplish this result, we have provided a cam 59, which is preferably carried upon the bracket 60, which constitutes a support for the bevel-gears 39 40 and the ratchet-wheel 37. This cam 59 is made adjustable by any suitable means around the axis of the ratchet-wheels 37 38. As the pawl 42 is reciprocated around the axis of the rock-shaft 44 the free end of said pawl is adapted to contact at its forward movement with the cam 59 and to disengage said pawl from its ratchet-wheel. It is obvious that an adjustment of the cam 59, by means of the set-screw 59ª or otherwise, will cause the pawl to disengage the ratchet-wheel during any desired extent of movement of the pawl in the direction opposite that of the feed and will prevent the reëngagement of said pawl with the ratchet-wheel until it again comes to the point on the cam where it was thrown out of engagement. Thus a pawl may be caused to engage adjacent teeth or may be allowed to travel the distance of two or more teeth before it engages a ratchet-wheel to step it intermittently the distance of one or more teeth, as desired. In order that the ribbon-spools may be operated by hand, we have provided each of the ratchet-wheels with a handle 61, whereby said ratchet-wheels can be rotated independently of the automatic operation thereof to transmit motion through the bevel-gear 39 40 to the spindle 41, which carries the ribbon-spools.

Reference is had to Figs. 12 and 13, which represent the platen and the casing connected therewith, which is adapted to be shifted vertically independently of the platen-carriage for the purpose of writing upper-case or lower-case characters.

In our former patent, hereinbefore referred to, we have disclosed a system of feed-rollers which coöperate with the paper-platen to provide an efficient feed of the paper. Our present invention is in the nature of an improvement on the feeding devices disclosed in said former patent.

In Figs. 12 and 13, 62 represents a series of feed-rollers which are adapted to project through apertures 63 in a guide-plate forming a portion of the casing of the platen and to bear upon the platen 2. These rollers are carried by a shaft 64, which is supported by arms 65, one at each end of the platen. These arms 65 are provided with ratchet-faced hubs 66, each of which engages a corresponding ratchet-faced collar 67, which is connected with a spring 68, the hub 66, collar 67, and spring 68 being adapted to rotate around a supporting-shaft 69. The opposite end of each of the springs 68 from that which is connected with the collar 67 is secured to an arm 70, which carries a shaft that forms a support for a series of rollers 71, which, like the rollers 62, bear against the face of the platen 2. Thus it will be seen that the springs 68 normally maintain both sets of rollers 62 71 in contact with the platen and that the tension of the spring 68 can be regulated by the clutch-section or ratchet-faced collar 67. It is sometimes desirable to throw these rollers out of contact with the platen in order that the paper may be straightened thereon and for other purposes. To accomplish this end, we provide cam-faces 72, formed integral with collars 73, which are adjustably arranged or secured upon the shaft 69 by set-screws 74 or otherwise. Coöperating with these cams are two sliding arms 75, which are carried by a longitudinally-movable rod 76, that connects with a piece 77, which is adapted to be shifted in the direction of the axis of the platen by hand-lever 78 or otherwise. The free ends of each of the arms 75 take under the shafts 64 and 79 of the feed-rollers, so that a movement of the sliding arms 75 in the direction of the arrow, Fig. 13, will cause the same to ride up the cam 72, thereby raising the shafts 64 and 79 of the feed-rollers and causing said feed-rollers to be carried out of contact with the face of the platen, a spring 80 being utilized to restore the sliding arms to their normal position.

The improved means for supporting the ribbon-spools to prevent the escape of the ribbon therefrom which are illustrated in the accompanying drawings and which are about to be described form no part of our present invention, but are included in a separate divisional application, Serial No. 708,952, filed March 13, 1899.

Figure 10:
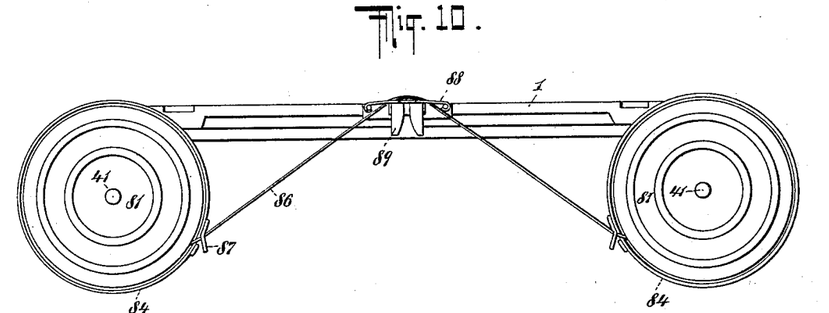
Fig. 10 is an isolated top view of the ribbon-spools and guide.
Figure 11:
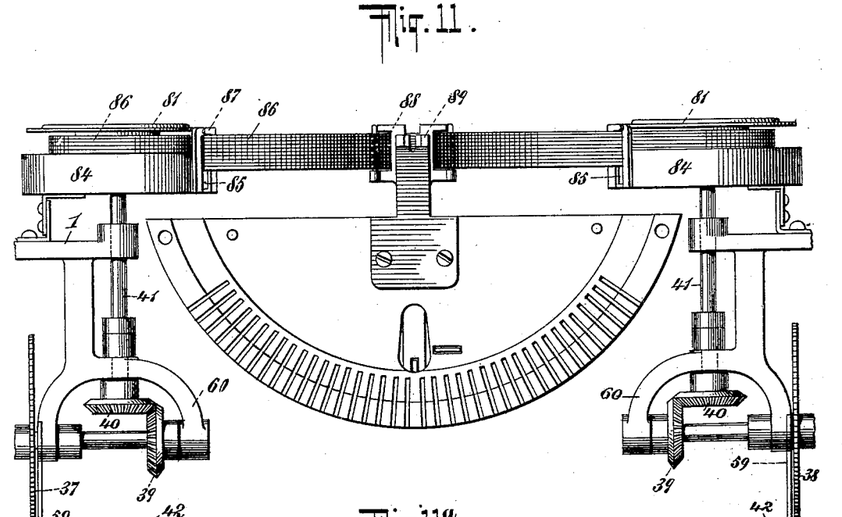
Fig. 11 is a front view of the same.
Figure 11A:
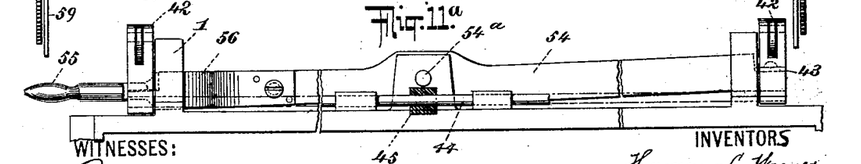

It has been common heretofore to support ribbon-spools so that the laminæ or layers of ribbon will be vertically supported upon the spools, and should the ribbon become slack there would be a liability of the ribbon dropping from the spool. Special reference being had to Figs. 6, 10, and 11, it will be seen that each of the ribbon-spools 81 is maintained centrally upon a spindle 41, to which is secured a disk 82, from which projects a pin 83, eccentric to the axis of the spindle 41. This pin 83 is adapted to engage in a corresponding recess 84 in a ribbon-spool 81, so that movement transmitted to the spindle 41 is transmitted to the spool carried thereby. Below and partly surrounding the ribbon-spool is a casing 84, which is apertured, as indicated at 85, for the passage of the ribbon 86, and above the aperture 85 in the ribbon-spool casing projects a guide-finger 87, which prevents the ribbon from being withdrawn upwardly from the spool or casing during the operation of the machine, allowing, however, of the ready removal of the ribbon when the same is carried to a position which it does not normally have when the machine is in operation. It will be observed that by this means the ribbon is prevented from dropping off the spool, the casing acting as a guide for the ribbon in case of slack being had or a tendency to unwind, the outward limit of movement of the ribbon being controlled by the casing and a further operation of the machine tending to take up the slack and automatically tighten and straighten the laminæ of ribbon on the spool. The ribbon is conveyed from spool to spool in any desirable manner. In the present instance we have shown it conveyed to a ribbon-guide 88, which likewise is provided with arms 89, that constitute a guide for the type-bars.

The next feature of our invention consists of an improved detachable guide, which is simple in construction and may be readily applied to or disconnected from the machine to enable an operator to write envelops, postal-cards, and narrow papers of all descriptions without difficulty when desired and to detach and remove said guide when it is not in use. This envelop-guide is represented in Figs. 2, 3, 7, 8, and 9, wherein 90 represents a rod which is of sufficient length to project across the face of the platen and is adapted to be pivotally seated in bearings 91 92, supported by the stationary guide-plates $92^a$, which are connected to or form part of the casing of the platen at or near opposite ends of the platen. The bearing 91 comprises a perforated ear in which the rod is adapted to seat itself and oscillate. The bearing 92, which is shown in detail in Fig. 8, comprises a perforated ear 93, in which an end 94 of the rod 90 is adapted to seat itself. Projecting from this end of the rod is an angle-piece 95, which forms a shoulder 96, adapted to bear against the perforated ear 93 when the envelop-guide is in operative position. The free end of this angle-piece 95 is provided with a depression 97, in which an arm 98 of the spring-plate 99 is adapted to bear and to lock the rod 90 against withdrawal from its supports. This spring-pressed plate likewise constitutes a spring which normally maintains the finger 100 of the envelop-guide in the position represented in Fig. 3, the handpiece 101 being connected to said finger to shift it out of its normal position against the tension of the spring-plate 99, the rod 90 acting as a rock-shaft for this purpose. It will be observed that by this means a guide 100 is provided at the center of the platen, so as to retain narrow paper, envelops, postal-cards, and the like, which are too narrow to be held by the stationary plates 92$^a$, against the platen in proper position to be written upon. In order to detach the guide, it is merely necessary to deflect the spring-plate 99 forward until the arm 98 thereof is withdrawn from the depression 97 in the angle-piece, when the rod 90 may be moved to the right to withdraw the end 94 from its bearing. After the end 94 has been withdrawn the opposite end of the rod 90 may be withdrawn from its bearing and the rod removed.

Figures 2, 3, 4:
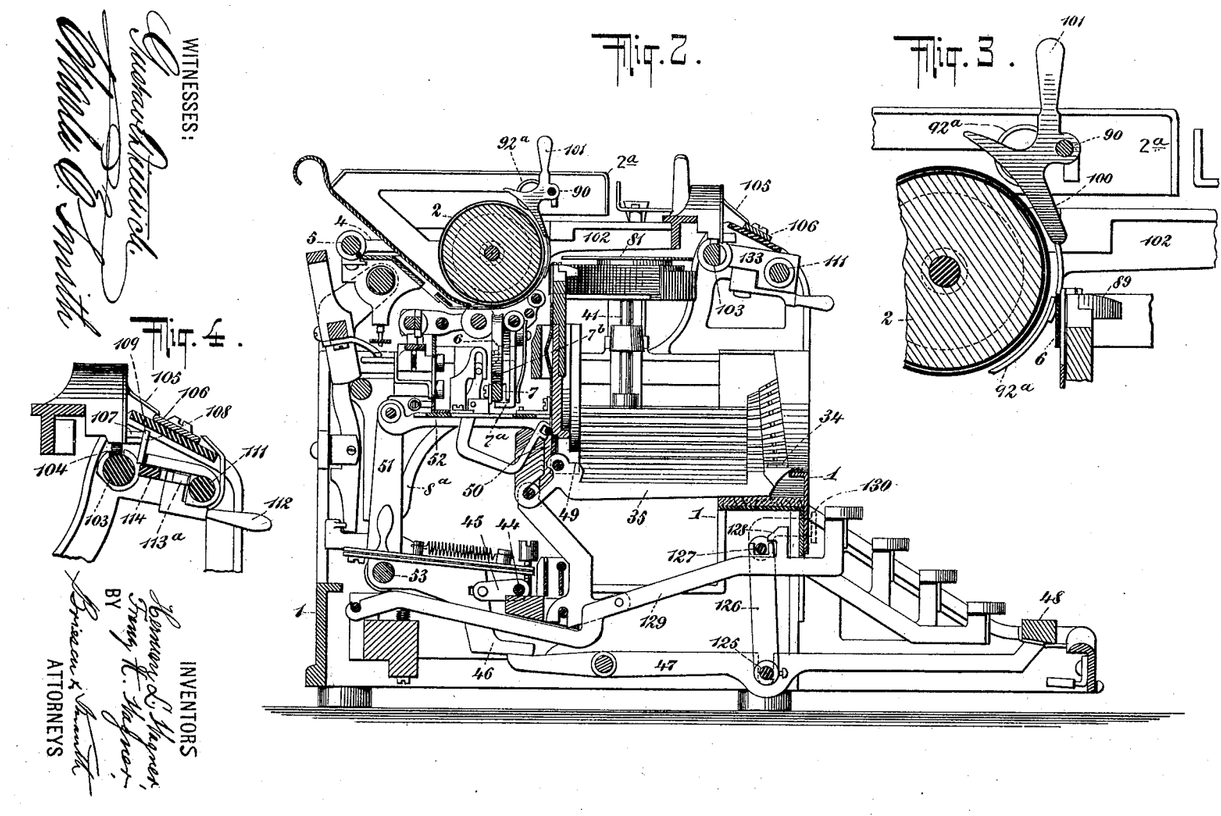
Fig. 2 is a central transverse sectional view of the same on the line 2 2, Fig. 1.
Fig. 3 is an enlarged detail transverse sectional view through the paper-platen and envelop-guide.
Fig. 4 is an enlarged detail transverse sectional view of the carriage-stop.
Figure 4A:
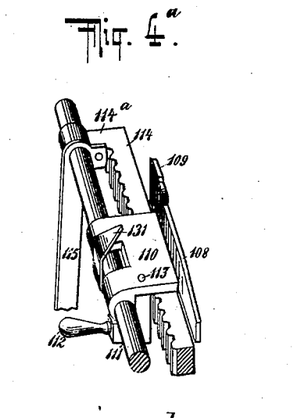
Figure 4B:
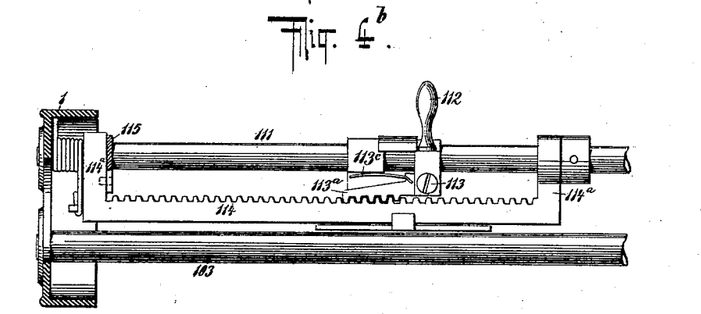

The next feature of our invention consists in hand-operated means for releasing the type-bar lock after the same has been operated automatically to lock the type-bars against movement when the carriage has traversed to the end stop. This means is best represented in Figs. 2, 4, 4$^a$, 4$^b$, 5, 5$^a$, 5$^b$, and 5$^c$. The paper-carriage 102 is supported at the front of the machine upon a rod 103, connected at each end to the frame of the machine. This rod constitutes a bearing for a roller 104, carried by the carriage. A pointer 105 on the carriage is adapted to coöperate with the scale 106 on the frame of the machine to designate the printing-point. A stud 107 likewise projects from the forward portion of the carriage and is adapted to contact with a cam 108, above the highest portion of which is a stop 109. This cam 108 is carried by a sleeve 110, which is adapted to slide longitudinally upon a supporting-rod 111, the handle 112 being utilized to traverse the sleeve with its cam and stop along said rod. This handle is pivoted to the sleeve or sliding piece, as indicated at 113, and is in the nature of a bell-crank lever, one end 113$^a$ (see Fig. 4$^b$) of which is provided with ratchet-teeth, which are adapted to engage corresponding ratchet-teeth on a short ratchet-rod 114 upon the left-hand half of the machine, the ratchet-teeth on the pawl being normally maintained in engagement with the rack by a suitable spring 113$^c$, similar to the spring 139, Fig. 7. This ratchet 114 is carried by arms 114$^a$, which support it upon the rod 111, around which it is adapted to vibrate. Rigidly connected with these arms is a depending arm 115, which is provided with a pin 116, which engages an arm 117 and moves it a short distance in either direction at the extreme movement of the arm 115. The pin 116 on the depending arm 115 allows of said arm 115 nearly completing its movement in either direction before it reaches contact with either of the studs 118, carried by the lever 117. The intermediate movement of the depending arm 115 between the studs 118 on the lever 117 allows the pin 119 on the lower end thereof to contact with the pawl 120, which is pivoted at 121 to a pivoted arm 122, which carries a hammer 123, adapted to ring a bell 124. The pawl 120 is provided with a flange 120$^a$, which projects from one face thereof and against which the pin 119 is adapted to engage on the upper side in its forward movement and on the under side in its backward movement. The forward movement of the depending arm 115, which is brought about by a depression of the rack 114 in the manner described, causes a depression of the forward end of the lever 122 through the pawl 120 until it passes the flange 120$^a$ of the pawl, when the lever 122 is released and the hammer thereon allowed to strike the bell. The backward movement of the depending arm 115 causes the pin 119 to raise the pawl 120 around its pivot, as indicated in Fig. 5$^c$, and thereby causes the pawl to be carried out of the path of the pin 119 in its backward movement. Connected with the arm 117 is a rockshaft 125, from which project arms 126, (see Fig. 2,) that carry a rod 127, which projects the entire length of the machine. This rod 127 is adapted to move into the path of a catch 128 on each of the type-key levers 129 and lock the same against movement. Connected with the rod 127 is a button 130, which projects through the casing or framing 1 of the machine to the forward side thereof in a convenient place to be moved by the operator. By this means the rod 127 can be readily forced out of the path of the catches 128 of the type-keys after the same have been automatically locked.

Figure 1:
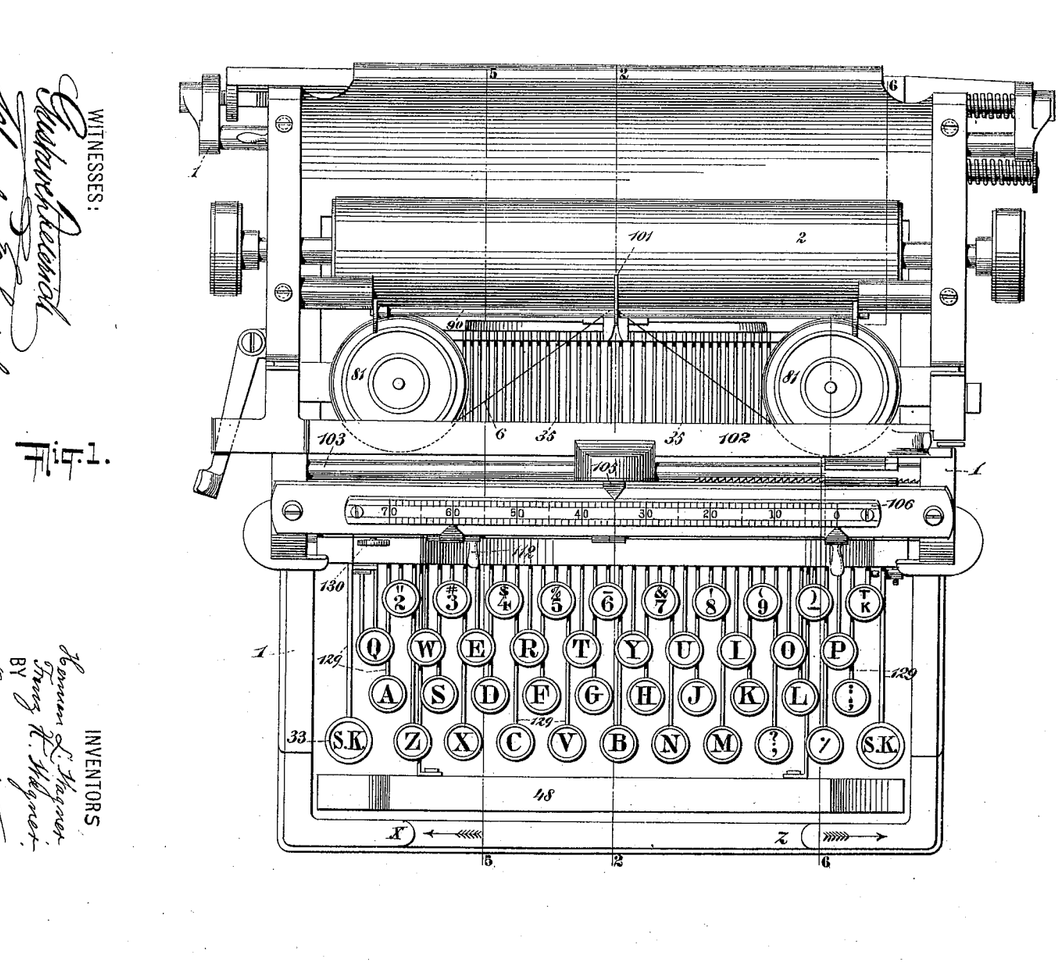
Figure 1 is a top view of a type-writing machine embodying our invention.

The operation of the automatic locking of the type-keys is brought about as follows: The handle 112 of the end stop is turned on its pivot, and the sleeve 110, together with the parts connected therewith, are moved along the rod 111 to a point where it is desired the carriage should stop at the end of a line. This is indicated by a pointer 131, which is carried by the sleeve and coöperates with the scale 106. Thus, for instance, the stop having been set at the point 60, as indicated in Fig. 1, the carriage will traverse the frame until the pointer 105 reaches the indication 60 on the scale, when it is stopped. Just before having reached the point 60 on the scale, however, the stud 107 on the carriage contacts with the cam 108 on the end stop and forces the stop around its pivot and depresses the rack 114, which causes the depending arm 115, connected with supporting-arms thereof, to be moved in the direction of the arrow in Fig. 5, and motion is thus transmitted to the bell-hammer to cause the bell 124 to be sounded in the manner hereinbefore described to notify the operator that the end of the line is about to be reached. Near the end of the movement of the depending arm 115 the front lug 118 on the arm 117 is engaged by the pin 116, and the rock-shaft 125 is moved against the tension of its spring 132. This movement of the rock-shaft 125 causes the rod 127, through the connecting-arms 126, to be moved forward into the path of the catches 128 upon the type-key levers 129 and lock the same against movement, the movement of the rod at the same time forcing the button 130 outward. The rear lug 118 assures the proper releasing of the key-levers in the event of the spring 132 failing to act. It sometimes occurs that one or more additional letters would complete a word and that a proper division of the word so far written is impracticable. By pressing the button 130 the rod 127 is forced out of the path of the catches 128 on the type-keys, when the same may be operated to write the additional letter or letters desired. The advantage of this feature of our present invention consists in being able to readily unlock the locking-bar after the same has been automatically shifted to lock the type-keys against movement.

Any suitable marginal stop may be provided for our device. In the present instance we have shown a marginal stop which is somewhat similar in construction to the end stop. In this construction a sleeve or sliding block 133 embraces the rod 111 and also embraces a rod 134, which has a ratchet-face 135, preferably extending only along the right-hand half of the rod. Coöperating with the ratchet 135 is a pivoted bell-crank pawl 136, which is provided with a handle 137 and a ratchet-face 138, adapted to engage the ratchet-rod 134 and prevent the sliding block 133 from being moved toward the right, a spring 139 tending to normally maintain the parts in the locked position. The block 133 is likewise provided with an abutment 140, against which an abutment on the front rail 141 of the carriage is adapted to abut to limit the movement of the carriage toward the right.

What we claim, and desire to secure by Letters Patent, is—

1. In a type-writer, the combination of a paper-platen, a shiftable platen-casing therefor, a shift-key and coöperating shifting mechanism for shifting said platen-casing and platen to bring the latter into position to receive the impact of different types on a single type-bar and a locking-lever independent of said shift-key platen-casing and shifting mechanism which locking-lever is adapted to be moved at each operation of the shifting mechanism and to coöperate with the shifting mechanism to lock the same against vibration when the platen is moved.

2. In a type-writer, the combination of a paper-platen, a shiftable platen-casing therefor, a shift-key and a coöperating platen-supporting lever for shifting said platen-casing and platen to bring it into position to receive the impact of different types on a single type-bar, locking mechanism to retain the platen in a shifted position to receive the impact of an upper-case character, a locking-lever independent of said shift-key platen-casing and shifting mechanism and adapted to be operated at each movement of the shift-key and to move independently of the shift-key and means on said locking-lever which coöperate with means on the platen-supporting lever to lock the same against vibration when the platen is shifted.

3. In a type-writer, the combination of a paper-platen, a shift-key and a coöperating platen-supporting lever for shifting said platen to bring it into position to receive the impact of different types on a single type-bar and a locking-lever adapted to be operated by the shift-key at each operation thereof and to move independently thereof, said locking-lever being provided with means which are adapted to coöperate with the platen-supporting lever to lock the same against vibration when the platen is in either the shifted or normal position.

4. In a type-writer, the combination of a paper-platen, a shift-key and a coöperating platen-supporting lever for shifting said platen to bring it into position to receive the impact of different types on a single type-bar and a locking-lever independent of the shift-key and adapted to be operated at each operation of the shift-key, means on said locking-lever which are adapted to coöperate with the platen-supporting lever to lock the same against vibration when the platen is in either the normal or shifted position.

5. In a type-writer, the combination of a paper-platen, a shift-key and a coöperating platen-supporting lever for shifting said platen to bring it into position to receive the impact of different types on a single type-bar, a locking-lever movable independently of the shift-key and adapted to be operated by said shift-key at each operation thereof and to engage the platen-supporting lever to lock the same against vibration when the platen is in either the normal or shifted position and to automatically release the platen-supporting lever when the shift-key is operated.

6. In a type-writer, the combination of a paper-platen, a shift-key and a coöperating platen-supporting lever for shifting said platen to bring it into position to receive the impact of different types on a single type-bar, an angular locking-stud on said platen-supporting lever, a locking-lever independent of said shift-key and adapted to be operated at each operation of said shift-key, said locking-lever having a plurality of locking-openings therein in which the stud on the shifting-lever is adapted to engage to prevent vibration of the platen-supporting lever in either the normal or shifted position and means for operating said locking-lever.

7. In a type-writer, the combination of a paper-platen, a temporary and a permanent shift-key, a platen-supporting lever adapted to coöperate with one of said shift-keys for shifting said platen to bring it into position to receive the impact of different types on a single type-bar, a locking-stud on said platen-supporting lever, a locking-lever independent of the shift-keys, said locking-lever having a plurality of locking-openings therein in which the stud on the platen-supporting lever is adapted to engage to prevent vibration of the platen-supporting lever and intermediate mechanism between the shift-keys and the locking-lever, whereby motion is communicated from either of the shift-keys to the locking-lever and the platen is locked against vibration in the normal and shifted positions.

8. In a type-writer, the combination of a paper-platen, temporary and permanent platen-shifting keys with their coöperating shifting means to bring the platen into position to receive the impact of different types on a single type-bar, securing means coöperating with said permanent shifting-key to maintain the platen in the position to which it has been shifted and a locking-lever coöperating with the shifting means to prevent vibration when the platen is shifted.

9. In a type-writer, the combination of a paper-platen, temporary and permanent platen-shifting keys with their coöperating shifting means to bring the platen into position to receive the impact of different types on a single type-bar, securing means coöperating with said permanent shifting-key to maintain the platen in the position to which it has been shifted, a locking-lever independent of the shifting-keys and coöperating with the shifting means to prevent vibration when the platen is shifted and intermediate mechanism between the shifting-keys and locking-lever to operate said locking-lever.

10. In a type-writer, the combination of a paper-platen, temporary and permanent platen-shifting keys with coöperating shifting means to bring the platen into position to receive the impact of different types on a single type-bar, securing means coöperating with said permanent shifting-key to maintain the platen in the position to which it has been shifted, a locking-lever independent of the shifting-keys and shifting means and mechanism coöperating with the shifting means to prevent vibration when the platen is shifted and intermediate mechanism between both of the shifting-keys and the locking-lever to bring about an operation of the locking-lever when either of the shifting-keys is operated.

11. In a type-writer, the combination of a paper-platen, temporary and permanent platen-shifting keys with coöperating shifting means to bring the platen into position to receive the impact of different types on a single type-bar, securing means coöperating with said permanent shifting-key to maintain the platen in the position to which it has been shifted, intermediate mechanism between the temporary shifting-key and the securing means for releasing the securing means on the depression of the temporary shifting-key and a locking-lever coöperating with the shifting means to prevent vibration when the platen is shifted.

12. In a type-writer, the combination of a paper-platen, temporary and permanent platen-shifting keys with coöperating shifting means to bring the platen into position to receive the impact of different types on a single type-bar, securing means coöperating with said permanent shifting-key to maintain the platen in the position to which it has been shifted, intermediate mechanism between the temporary shifting-key and the securing means for releasing the securing means on the depression of the temporary shifting-key, a locking-lever independent of the shifting means coöperating with the shifting means to prevent vibration when the platen is shifted and intermediate mechanism between the shifting-keys and the locking-lever to operate said locking-lever.

13. In a type-writer, the combination of a paper-platen, temporary and permanent platen-shifting keys with coöperating shifting means to bring the platen into position to receive the impact of different types on a single type-bar, securing means coöperating with said permanent shifting-key to maintain the platen in the position to which it has been shifted, intermediate mechanism between the temporary shifting-key and the securing means for releasing the securing means on the depression of the temporary shifting-key, a locking-lever independent of the shifting means coöperating with the shifting means to prevent vibration when the platen is in the normal and shifted position and intermediate mechanism between both of the shifting-keys and the locking-lever to bring about an operation of the locking-lever when either of the shifting-keys is operated.

14. In a type-writer, the combination of a paper-platen, a rail upon which said platen is supported, levers supporting said rail, a shifting-key to operate said levers to move the platen and a locking-lever independent of the shifting-key and supporting-levers said locking-lever being adapted to be operated by the shift-key at each operation thereof and to coöperate with one of the supporting-levers to prevent vibration of the platen in the normal and shifted positions.

15. In a type-writer, the combination of a paper-platen, a rail upon which said platen is supported, levers supporting said rail, one or more keys for shifting said levers to move the platen, a locking-lever independent of the shifting-keys and supporting-levers and coöperating with one of the supporting-levers to prevent vibration of the platen and intermediate mechanism between the shifting-key and the locking-lever, whereby a depression of a shifting-key will shift the platen and move the locking-lever to lock the platen against vibration in the shifted position.

16. In a type-writer, the combination of a paper-platen, a rail upon which said platen is supported, levers supporting said rail, a temporary and permanent shifting-key for shifting said supporting-levers to move the platen, a locking-lever independent of the shifting-keys and coöperating with one of the supporting-levers to prevent vibration of the platen, intermediate mechanism between the shifting-keys and the locking-lever, whereby a depression of a shifting-key will shift the platen and move the locking-lever to lock the platen against vibration in the shifted position, which mechanism consists of a rock-shaft having a locking-pawl rigidly connected therewith which is adapted to retain the permanent shifting-key when the same is depressed and a rigidly-connected bell-crank lever coöperating with the temporary shifting-key and with the locking-lever.

17. The combination with a paper-platen of independently-movable parallel shafts, a plurality of feed-rollers, mounted on each of said shafts, and means for simultaneously throwing all of said feed-rollers out of contact with the platen.

18. The combination with a paper-platen of feed-rollers, independent supports for each set of said feed-rollers, arms engaging the said supports, a longitudinally-movable rod upon which said arms are mounted and stationary cams coöperating with said arms to simultaneously throw all of said feed-rollers out of contact with the platen.

19. The combination with a paper-platen, of feed-rollers, a support for said feed-rollers, a moving arm or arms adapted to engage the feed-roller support, a longitudinally-movable rod upon which said moving arm or arms are mounted and a cam coöperating with the engaging arm or each of them to move the feed-rollers out of contact with the platen and means for moving said longitudinally-movable rod.

20. The combination with a paper-platen of a removable spring-pressed pivoted rod carried by the casing of said platen and an arm or finger rigidly connected to and projecting from said rod intermediate of its ends and adapted to be normally maintained adjacent to the platen by the spring-pressed rod to guide the paper on the platen.

21. The combination with a paper-platen of a removable spring-pressed rod carried by the casing of said platen and adapted to oscillate in its bearings, a projection extending from said rod at or near one end thereof, a spring adapted to contact with said projection and an arm or finger projecting from said rod intermediate of its ends and adapted to be normally maintained adjacent to the platen by the spring bearing on the projection on the rod to guide the paper to the platen.

22. In a type-writer, the combination with a movable carriage of a series of type-key levers, an adjustable line-stop carried at the front of the machine, a scale at the front of the machine and with which said line-stop coöperates, means controlled by the line-stop for automatically locking said type-key levers against movement when the carriage reaches the line-stop and hand-operated means for releasing said locking means.

23. In a type-writer, the combination with a movable carriage, of a series of type-key levers, an adjustable line-stop carried at the front of the machine, a scale carried at the front of the machine and with which said line-stop coöperates, means for locking said type-key levers against movement, intermediate mechanism between said locking means and line-stop for automatically operating the locking means when the carriage reaches the line-stop and hand-operated means for operating the locking means to release the same.

24. In a type-writer, the combination with a movable carriage, of a series of type-key levers, a vibrating adjustable line-stop carried at the front of the machine and adapted to be vibrated by said carriage, a scale carried at the front of the machine and with which said line-stop coöperates, means for locking the type-key levers against movement, intermediate mechanism between the vibrating line-stop and the locking means for automatically operating the locking means when the line-stop is vibrated and hand-operated means for releasing the locking means.

25. In a type-writer, the combination with a movable carriage, of a series of type-key levers each of which has a locking-catch thereon, a vibrating line-stop adapted to be vibrated by said carriage, a universal locking-bar adapted to engage the catches on the type-key levers to maintain the same against movement, intermediate mechanism between the vibrating line-stop and the universal locking-bar for automatically operating the locking-bar when the line-stop is vibrated and hand-operated means for releasing the locking-bar from engagement with the type-key levers.

26. In a type-writer, the combination with a movable carriage, of a series of type-key levers each of which has a locking-catch thereon, a vibrating line-stop adapted to be vibrated by said carriage, a bell and means for sounding said bell by the vibration of the line-stop, a universal locking-bar adapted to engage the catches on the type-key levers to maintain the same against movement, intermediate mechanism between the vibrating line-stop and the universal locking-bar for automatically operating the locking-bar when the line-stop is vibrated and hand-operated means for releasing the locking-bar from engagement with the type-key levers.

27. In a type-writer, the combination with a movable carriage, of a series of type-key levers each of which has a locking-catch thereon, an adjustable vibrating line-stop adapted to be vibrated by said carriage, a spring-pressed universal locking-bar normally maintained out of the path of the locking-catches on the type-key levers, intermediate mechanism between the vibrating line-stop and the universal bar and a releasing-button connected with said universal bar to throw the same out of engagement after it has been automatically thrown into engagement by the line-stop.

28. In a type-writer, the combination with a movable carriage, of a series of type-key levers each of which has a locking-catch thereon, a vibrating line-stop adapted to be vibrated by said carriage, bell-sounding mechanism adapted to be operated by said stop a spring-pressed universal locking-bar normally maintained out of the path of the locking-catches on the type-key levers, intermediate mechanism between the vibrating line-stop and the universal bar to throw the same out of engagement after it has been automatically thrown into engagement by the line-stop without effecting an operation of the bell-sounding mechanism.

29. In a type-writer, the combination with a movable carriage, of a series of type-key levers, a vibrating line-stop comprising a vibrating longitudinally-movable block, a spring-pressed pawl pivoted thereto, a rack adapted to vibrate with said block and with which the pawl is adapted to engage, mechanism for locking the type-key levers against movement, intermediate mechanism between said vibrating stop and locking mechanism to automatically operate the latter and hand-operated means for throwing said locking means out of operation to permit one or more characters to be added.

30. In a type-writer, the combination with a movable carriage of a series of type-key levers, a rod, a rack adapted to vibrate on said rod and eccentric to the axis thereof, a universal bar for locking the type-key levers against movement, a rocking arm connected with said universal bar, an arm depending from said rack and carrying a pin which is adapted to engage the rocking arm of the universal bar at its extreme movement and a vibrating line-stop carried by and longitudinally adjustable on said rod, said line-stop comprising a longitudinally-movable block, a spring-pressed pivoted hand-operated pawl adapted to coöperate with the rack, and hand-operated means for throwing the universal bar out of the locking position after it has been automatically operated to permit one or more characters to be added.

HERMAN L. WAGNER.
FRANZ X. WAGNER.

Witnesses:
CHARLES E. SMITH,
MAURICE BLOCK.